(12) United States Patent
Kumar et al.

(10) Patent No.: US 10,324,746 B2
(45) Date of Patent: Jun. 18, 2019

(54) EXTENDED CONTEXT DELIVERY FOR CONTEXT-BASED AUTHORIZATION

(71) Applicant: Nicira, Inc., Palo Alto, CA (US)

(72) Inventors: Vasantha Kumar, Tamil Nadu (IN);
Prasad Sharad Dabak, Pune (IN);
Azeem Feroz, San Jose, CA (US);
Amit Vasant Patil, Pune (IN)

(73) Assignee: NICIRA, INC., Palo Alto, CA (US)

( * ) Notice: Subject to any disclaimer, the term of this patent is extended or adjusted under 35 U.S.C. 154(b) by 442 days.

(21) Appl. No.: 15/016,216

(22) Filed: Feb. 4, 2016

(65) Prior Publication Data
US 2017/0126677 A1    May 4, 2017

(30) Foreign Application Priority Data
Nov. 3, 2015  (IN) ............................ 5946/CHE/2015

(51) Int. Cl.
*H04L 29/06* (2006.01)
*G06F 9/455* (2018.01)
*G06F 21/53* (2013.01)

(52) U.S. Cl.
CPC .......... *G06F 9/45558* (2013.01); *G06F 21/53* (2013.01); *H04L 63/0227* (2013.01); *H04L 63/102* (2013.01); *H04L 63/20* (2013.01); *G06F 2009/45587* (2013.01); *G06F 2009/45595* (2013.01)

(58) Field of Classification Search
CPC ... H04L 63/20; H04L 63/102; H04L 63/0227; G06F 9/45558; G06F 2009/45587; G06F 2009/45595; G06F 21/53
See application file for complete search history.

(56) References Cited

U.S. PATENT DOCUMENTS

| 2014/0007222 A1* | 1/2014 | Qureshi | G06F 21/10 726/16 |
| 2014/0230008 A1* | 8/2014 | Feroz | H04L 63/20 726/1 |

* cited by examiner

*Primary Examiner* — Baotran N To
(74) *Attorney, Agent, or Firm* — Adeli LLP (57) ABSTRACT

Some embodiments provide a novel method for authorizing network requests for a machine in a network. In some embodiments, the method is performed by security agents that execute on virtual machines operating on a host machine. In some embodiments, the method captures a network request (e.g., network control packets, socket connection request, etc.) from a primary application executing on the machine. The method identifies an extended context for the network request and determines whether the network request is authorized based on the extended context. The method then processes the network request according to the determination. The extended context of some embodiments includes identifications for primary and secondary applications associated with the network request. Alternatively, or conjunctively, some embodiments include identifications for primary and secondary users associated with the network request.

20 Claims, 9 Drawing Sheets

EXTENDED CONTEXT DELIVERY FOR CONTEXT-BASED AUTHORIZATION

BACKGROUND

As networks expand, it becomes increasingly difficult to manage and maintain network policies for the different machines of the network. Various security applications are used to provide security for a network, including firewalls, antivirus and malware detection, etc.

Firewalls are used to enforce network security policies by monitoring and controlling network traffic. Many firewalls filter the network traffic based on various characteristics of the network traffic (e.g., port information, source/destination address information, etc.). Some firewalls perform deep packet inspection to further analyze the contents of the network traffic to identify applications or protocols used by the network traffic (e.g., Hypertext Transfer Protocol (HTTP), File Transfer Protocol (FTP), Domain Name System (DNS), etc.). However, packet inspection requires significant processing resources that can increase network latency.

In virtualized networks in particular, security and authorization for network requests to and from the guest machines becomes increasingly complex and difficult. Virtual hosting networks often have multiple entry points to the network, increasing the need for security and authorization at each of the end machines. In some cases, virtualized environments rely on firewall rules defined in a network policy to protect networks from malicious traffic.

In some cases, network policies are defined based on contexts for various network requests made in the network. Context-based authorization, such as an identity firewall, allows an administrator in a network to allow or disallow connections based on the context (e.g., the identity of a user and/or application) of the request, rather than simply based on ports and addresses of the packets. The identity firewall allows connections and communications between end machines in the network to be monitored and managed based on the identities of the users and/or applications. For example, in some cases, connections from a particular machine to a server may be allowed from certain applications or by certain users, while not from others.

One of the challenges in today's hosting system networks is providing efficient and secure context-based authorization for virtual machines operating on host machines in a network. In many cases, the hosting system networks lack sufficient information to make allow/block enforcement decisions for the network requests. In some siutations, a malicious application can break the security policies of a network by generating network events as though they are being performed by a genuine user or application.

BRIEF SUMMARY

Some embodiments provide a novel method for authorizing network requests for a machine in a network. In some embodiments, the method is performed by security agents that execute on guest virtual machines operating on a host machine. In some embodiments, the method captures a network request (e.g., network control packets, socket connection request, etc.) from a primary application executing on the guest machine and identifies a context for the network request.

The context of some embodiments includes information about the network request that is made, as well as information about the applications or users that initiated the network request. In some embodiments, the context includes not only the application that sends the network request, but also a second application, such as a plugin or secondary application that causes the first application to make the network request. The method of some embodiments identifies the second application by performing a stack walk through the call stack of the machine. In some embodiments, in addition to or instead of the application IDs, the context includes a first and second user. For example, in some cases a particular user may execute a process or thread while impersonating another user. The context of some such embodiments includes two tokens for both the impersonated user and the logged-in user.

The method then analyzes the network request and the identifications of the first and second applications (and/or identifications of first and second users) to determine whether to allow the network request. In some embodiments, a security agent operating on a guest machine analyzes the network requests by sending the network request and the context for the request to a security engine operating on the host machine. The security engine of some embodiments performs authorizations for the network requests of all of the guest virtual machines operating on the host machine.

In some embodiments, the security engine is one of many security virtual machines that operate on the host machine. Security virtual machines in some embodiments provide third-party security services (e.g., authorization, encryption, malware detection, anti-virus, etc.) through secured virtual machines that operate on the host machine. In some embodiments, the security virtual machines communicate with the security agents through a standardized protocol.

In some embodiments, the security engine enforces security policies for the network. The security policies are defined based on the identified context (e.g., application and/or user identifications), allowing an administrator to restrict network requests at a fine-grained level. The security engine of some embodiments makes authorization decisions for the network requests based on the application and/or user identifications of the context received from the security agent, as well as on a type of the network request. In some embodiments, the network request is associated with access to a network location or file, and the decision of whether to allow the access is based on system permissions for the user and/or the application that requests the access. The security engine then responds with the authorization decision, which the security agent on the machine uses to allow or reject the captured network request.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a novel method for authorizing network requests for a machine in a network. In some embodiments, the method is performed by security agents that execute on guest virtual machines operating on a host machine. In some embodiments, the method captures a network request (e.g., network control packets, socket connection request, etc.) from a primary application executing on the guest machine and identifies a context for the network request.

The context of some embodiments includes information about the network request that is made, as well as information about the applications or users that initiated the network request. In some embodiments, the context includes not only the application that sends the network request, but also a second application, such as a plugin or secondary application that causes the first application to make the network request. The method of some embodiments identifies the second application by performing a stack walk through the call stack of the machine. In some embodiments, in addition to or instead of the application IDs, the context includes a first and second user. For example, in some cases a particular user may execute a process or thread while impersonating another user. The context of some such embodiments includes two tokens for both the impersonated user and the logged-in user.

The method then analyzes the network request and the identifications of the first and second applications (and/or identifications of first and second users) to determine whether to allow the network request. In some embodiments, a security agent operating on a guest machine analyzes the network requests by sending the network request and the context for the request to a security engine operating on the host machine. The security engine of some embodiments performs authorizations for the network requests of all of the guest virtual machines operating on the host machine.

In some embodiments, the security engine is one of many security virtual machines that operate on the host machine. Security virtual machines in some embodiments provide third-party security services (e.g., authorization, encryption, malware detection, anti-virus, etc.) through secured virtual machines that operate on the host machine. In some embodiments, the security virtual machines communicate with the security agents through a standardized protocol.

In some embodiments, the security engine enforces security policies for the network. The security policies are defined based on the identified context (e.g., application and/or user identifications), allowing an administrator to restrict network requests at a fine-grained level. The security engine of some embodiments makes authorization decisions for the network requests based on the application and/or user identifications of the context received from the security agent, as well as on a type of the network request. In some embodiments, the network request is associated with access to a network location or file, and the decision of whether to allow the access is based on system permissions for the user and/or the application that requests the access. The security engine then responds with the authorization decision, which the security agent on the machine uses to allow or reject the captured network request.

An overview of the process for authorizing network requests using secondary information for machines in a network has been described above. Further details and examples of the authorization system and the authorization process are described below. Specifically, Section I describes a system for authorizing network requests using a security engine and a group of security agents that operate on machines in the network. Section II then describes the process and different examples of authorizing network requests using extended context information through the authorization system. Section III then describes an electronic system with which some embodiments of the invention are implemented.

I. Authorization System

Figure 1:
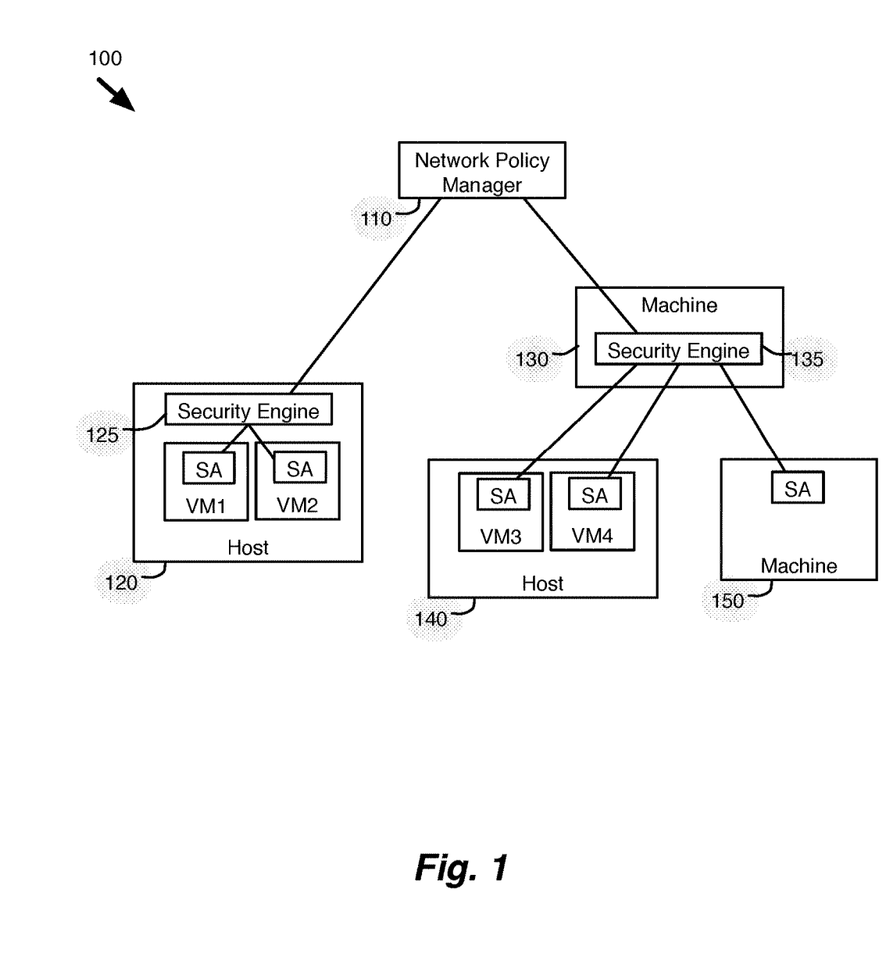
FIG. 1 illustrates an example of an authorization system that uses extended context information to enforce security policies for various machines in a network.

FIG. 1 illustrates an example of an authorization system that uses extended context information to enforce security policies for various machines in a network. The authorization system 100 includes a network policy manager 110, hosts 120 and 140, and server machines 130 and 150. The network policy manager communicates with various security engines 125 and 135 to enforce network policies, such as firewall rules, for the various end machines (i.e., virtual machines VM1-VM4, machine 150), which each executes a security agent (SA). The security agents use the security engines 125 and 135 to authorize network requests of the end machines in the authorization system 100.

The network policy manager 110 is for managing network policies for communications between end machines in a network. In some embodiments, a network administrator uses the network policy manager 110 to define a network policy that determines firewall rules and other security settings that can be pushed to the security engines 125 and 135 in the network. The centralized network policy manager 110 of some embodiments operates on a separate centralized network policy management server, while in other embodiments, the centralized network policy manager shares a physical server with guest virtual machines of the network.

The network policy manager 110 of some embodiments communicates with security engines 125 and 135 in the authorization system 100 to distribute and enforce the network policy. The security engines of some embodiments receive firewall rules and other network security settings and use the received security information to authorize network requests made by security agents operating on the end machines.

In this example, security engine 125 operates on a host machine 120, along with virtual machines (VMs) VM1 and VM2. The security engine 125 is a security appliance running on a dedicated secure virtual machine (SVM) that provides protection to all virtual machines on the host machine 120. Security engine 135 operates on another machine 130, and unlike security engine 125, operates on a separate machine from the security agents for VM3, VM4, and machine 150, for which it provides authorization services. In this example, security engine 135 is a dedicated security appliance (e.g., a server or other hardware device), which receives authorization requests from security agents operating on both virtual machines VM3 and VM4, as well as a bare-metal machine 150.

The security engines 125 and 135 of some embodiments are third party applications or appliances that communicate with the security agents through a standardized Application Programming Interface (API) (e.g., EPSec). The communication protocol allows the security agents to monitor file and network activity on the guest machines and to communicate the information to the third party security engines. The security engines 125 and 135 are described in further detail below with reference to FIG. 3.

Each end machine executes a security agent (SA) that communicates with a corresponding security engine to authorize various network requests of the virtual machines. The end machines include virtual machines VM1 and VM2. A virtual machine is managed by virtualization software executing on a physical host machine. Virtualization software can also manage additional virtual machines. Virtualization software can be native or hosted, and manages one or more virtual machines, permitting multiple concurrent instances of operating systems on the same computer hardware resources.

Each of the end machines also executes various applications for an end user of the guest machine. In some embodiments, applications operating on the end machines send network socket event requests. A network socket is an endpoint with a local address and local port. A resulting network connection includes a source IP, source port, protocol, destination IP, and destination port. Connection-oriented sockets such as Transmission Control Protocol (TCP) sockets may have a connection state, though not connectionless sockets such as User Datagram Protocol (UDP) sockets. A network socket event request may be a status change in a network socket, for example requested UDP or TCP events such as network open, network close, and listen.

When the applications (or the system) of the end machines make network requests, the security agents operating on the various end machines VM1-VM4 and machine 150 capture the network requests and authorize the requests with the security engines 125 and 135 before performing (or allowing) the network request for the end machine. In some embodiments, the security agent is a thin agent (e.g., Transport Driver Interface (TDI), Windows Filtering Platform (WFP), Netfilter, Winsock, etc.) that operates between layers of the network protocol stack on the end machines.

The security agents of some embodiments intercept file system and network calls and deliver them to the security engines for processing. The security engine makes a decision on the calls and provide the decision back to the security agents, which take action on the calls based on the received decision.

Figure 2:
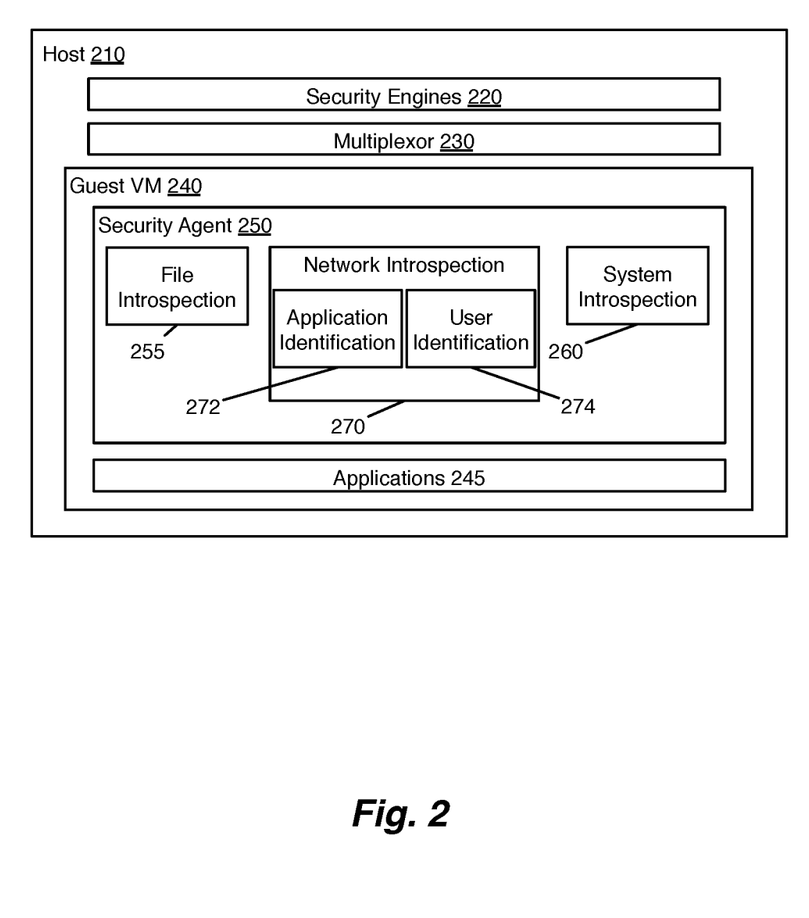
FIG. 2 illustrates an example of a security agent operating in a guest VM on a host machine.

FIG. 2 illustrates an example of a security agent operating in a guest VM on a host machine. The host machine 210 includes security engines 220, a multiplexor 230, and a guest VM (or end machine) 240. Guest VM 240 includes the security agent 250 and various applications 245 that operate within the operating system of guest VM 240. Although shown with a single guest VM 240 for this illustration, it should be understood that a host machine 210 could host several guest VMs, with each guest VM operating a security agent and application.

The security agent 250 of some embodiments acts as a thin agent between the applications and a network layer (e.g., a socket layer) of an operating system (OS) of the guest VM, in order to capture network requests made by the applications before allowing them to be processed by the OS. The security agent 250 of some embodiments may be may be implemented as a computer program that runs in the background, as a service or daemon within the operating system of the guest VM 240.

For example, Windows provides documented APIs to hook the Winsocket socket calls used by all the network applications in user mode. Winsock Service Provider Interface (SPI) functions allows the winsocklsp Dynamic Link Library (DLL) module to layer in-between the Windows socket layer and the applications. All the socket calls can be replaced by user-defined functions, which can do custom processing before actually invoking the Winsock calls. By registering a Winsock Layered Service Provider (LSP) at the top of the layered chain of LSPs, the applications will directly invoke the socket calls exposed by the LSP Dll. Socket calls "connect", "listen", "accept" and "closesocket" can be replaced to implement the functions (e.g., authorization, anti-virus, etc.) of the security agent.

In addition to capturing network requests of the system and applications, the security agent 250 of some embodiments monitors and collects context information (e.g., application, system, file, and user information) associated with the network requests. The security agent 250 of some embodiments uses the context information to make authorization decisions for the network requests.

As shown, the security agent 250 includes a file introspection module 255, a system introspection module 260, and a network introspection module 270. The file introspection module 255 and the system introspection module 260 of some embodiments are used to monitor system functions and access to files by applications that attempt network access. The file and system introspection modules and 255 and 260 of some embodiments are also used to monitor the system to collect information used for malware detection and other security functions. The network introspection module 270 captures the actual network requests and identifies information regarding the calling applications and/or users associated with each request.

In some embodiments, the various introspection modules communicate with each other to monitor and collect context information to be used to authorize network requests. For example, the network introspection module 270 of some embodiments passes the identity (e.g., the process identifier) of a calling application to the security agent 250, which provides the application ID to the file introspection module 255 with a request that the file introspection module 255 detect the application's access to each file and notify the security agent 250 of each detected access. The file introspection module 250 uses filters that it sets in the guest VM's 240 file system to identify any access of the identified application to all files or certain files (e.g., files of a particular category, such as non-system files, or data files) that are managed by the file system. In some embodiments, the file access information is included as part of the context for a network request, and is used to authorize the network request.

In some embodiments, the network introspection module 270 is called by the guest VM's TCP/IP stack each time the stack initiates or terminates a connection request. Through these calls, the network introspection module 270 captures (1) every new connection request that is made by applications 245 operating on the guest VM 240, and (2) contextual information (e.g., user identity, application context, etc.) for the new connections. As opposed to other solutions that perform deep packet inspection on every packet of the end machines, the network introspection module 270 of some embodiments only inspects packets to determine whether they are network connection packets, allowing other packets to pass through, minimizing the impact on the performance of the system. The network introspection module 270 enables the gathering of this information without the need to do costly deep packet introspection on the received guest VM data messages.

In some embodiments, the user and/or the application that initiates a particular network request is not the primary user/application associated with the network request, but rather a secondary user or application (e.g., a secondary application DLL operating within an application, a secondary driver that makes kernel system calls, a secondary logged-in user impersonating another user, etc.). In some cases, a network administrator may wish to restrict the secondary user or application, even when they are legitimately operating behind a primary user or application. In other cases, the secondary user or application is malicious and is attempting to circumvent the established network policies by masquerading as the primary caller.

The network introspection module 270 of some embodiments provides extended context information to allow network policies to be defined based on identifications of both the primary and secondary callers of the network request. By providing the extended context information, the network introspection module 270 of some embodiments is able to detect secondary malicious callers (e.g., applications, users, etc.). In this example, the network introspection module 270 includes an application identification module 272 and a user identification module 274 for identifying extended context information for a network request.

The application identification module 272 in some embodiments provides information about the primary and secondary applications associated with each network request of the applications 245. The application identification module 272 of some embodiments identifies the primary and secondary network-accessing applications when it initially detects an attempted network access. In some embodiments, the application identification module 272 also provides additional application information, such as the name of the process, application hash, publisher, etc.

In some embodiments, the application identification module 272 identifies a secondary application by performing a stack walk on the call stack of the guest VM 240 to get to the previous stack frame. From the address of the instruction pointer, the application identification module 272 retrieves the module name in the process space which invoked the network request. This can be a DLL name running in the process or the process itself. In some embodiments, the security agent 250 passes the extended module name and the address from which the call is invoked to the security engines 220 so that the security engines 220 can deduce whether the network connection should be allowed or denied based on the network policies. Below is a sample callstack to show a browser plugin making a TCP connection within the browser process space:

ChildEBP RetAddr
04ccf860 76cacb05 WS2_32!connect
04ccf860 76cacb05 WinsockLSP!LSPconnect
04ccf934 76ca3575 malicious!ICAsyncThread::CreateSelectSocket+0x228
04ccfc94 77a49ef2 KERNEL32!BaseThreadInitThunk+0xe
04ccfcd4 77a49ec5 ntdll_77a10000!_RtlUserThreadStart+0x70
04ccfcec 00000000 ntdll_77a10000!_RtlUserThreadStart+0x1b Based on the sample callstack, the application identification module 272 passes the return address "76cacb05" to the security engines 220. All the modules and their loaded address space is passed to the security engines 220 as part of the network event. With this information, security engines 220 can figure the module name (i.e., the DLL) from which the connection is initiated and, depending on the network policy, it can allow or deny the connection.

In some embodiments, the application identification module 272 also captures system requests made from the kernel of guest VM 240. In order to improve performance, many newer applications (e.g., Microsoft Internet Information Services (IIS) server, Windows Remote Desktop Protocol (RDP) server and Microsoft Server Message Block (SMB) server, etc.) use kernel sockets. When a significant number of drivers initiate network connections at the kernel, tracing the exact driver associated with each request gets complicated. Network connections can be made from the kernel mode using TDI clients or Winsock kernel. A malicious application can install a kernel mode driver to bypass the firewall rules based on process name. Since the drivers run as part of the kernel process, the network connections are seen as part of the system process.

In some embodiments, the application identification module 272 detects network connections initiated by the kernel and performs a stack walk on the call stack to identify a driver that initiates each network connection. For example, in Windows XP and above, a driver can make network connections at the kernel by sending TDI requests directly to the TCP driver. Starting from Microsoft Vista, Microsoft provided the Winsock kernel similar to the API calls in user mode. The current TDI filter, which is used at the kernel to sniff all the network connections, can be extended to perform a stack walk to fetch the driver information from which TDI request is generated.

In some cases, when a kernel driver sends a network connection request, the application identification module 272 identifies the corresponding system file name and path. This information of the driver and its associated path has to be sent to databases on the security engines 220 to provide precise information regarding the specific kernel component which was responsible for generating the event.

The security agent 250 also includes a user identification module 274 that identifies the primary and secondary users associated with each network request. The user identification module 274 of some embodiments can precisely identify which user initiated the connection, including the Active Directory (AD) groups of which the user is a member. For instance, if different users from the Finance and Human Resources groups of an enterprise are logged in on a terminal server, the user identification module 274 can identify which user from which group initiated a particular network connection.

In some embodiments, roles and other directory information for the identified users is retrieved by the security engines 220. In some such embodiments, the user identification module 274 passes primary and secondary user information to the security engines, which access a directory (e.g., Active Directory, etc.) to identify directory information (e.g., roles, groups, domains, etc.) for the primary and secondary users, and uses the directory information in conjunction with the defined network policies to make authorization decisions for network requests.

Once the introspection modules of the security agent 250 have captured a network request and collected the extended context information for the request, the security agent 250 of some embodiments uses a multiplexor 230 to send the network request and the extended context information to the security engines 220. In some embodiments, the introspection modules 255, 260, and 270 provide the gathered information to the multiplexor 222 through a VM communication interface (e.g., the VMCI interface of VMware Inc.).

In some embodiments, the multiplexor 230 provides different information to the different security engines based on the functions of each security engine. The security engines 220 of some embodiments include several third-party security virtual machines (SVMs) or applications that perform specialized security functions for end machines on the network.

In some embodiments, the security engines 220 examine security policies and rules for the network to determine whether the network request should be allowed or rejected. The security engines 220 then provide the determination back to the security agent 214, which processes (i.e., discards or performs) the network request.

Figure 3:
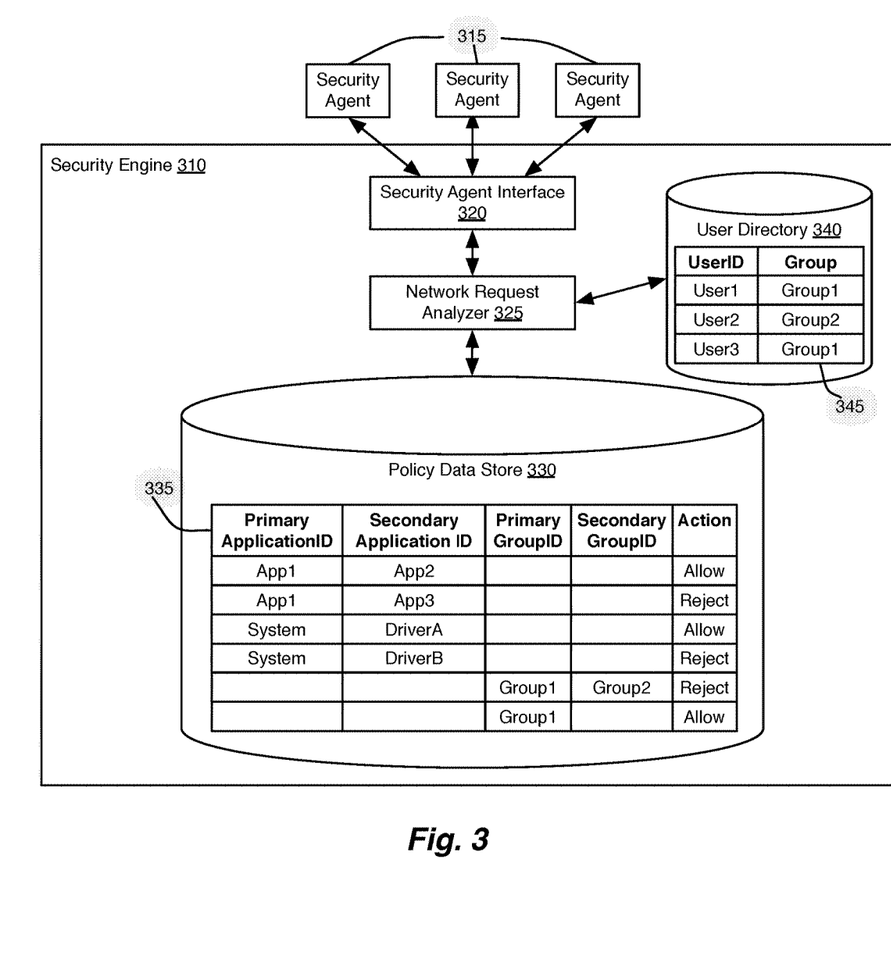
FIG. 3 illustrates a security engine for authorizing network requests from various machines.

FIG. 3 illustrates a security engine for authorizing network requests from various end machines in a network. The security engine 310 includes a security agent interface 320, a network request analyzer 325, a policy data store 330, and a user directory 340. The security engine 310 is for authorizing network requests received from the security agents 315 of end machines (not shown).

The security engine 310 communicates with the various security agents 315 through the security agent interface 320, receiving and sending network requests and authorization decisions. The security agent interface 320 of some embodiments uses an API (e.g., EPSec) to translate the received network request and context information to a format that is usable by various third-party security engines.

The network request analyzer 325 processes the received network requests and the extended contexts for the requests. The network request analyzer 325 analyzes the context information for each request to determine whether to authorize the request based on defined network policies and user permissions.

The network request analyzer 325 of some embodiments uses multiple data sources to determine whether a network request is allowed or rejected. In this example, the network request analyzer 325 access a policy data store 330 to access rules defined for a network policy, and a user directory 340 that provides information about the users (e.g., roles, groups, domains, etc.) to be used for determining whether the network request should be authorized. In some embodiments, the user directory 340 is located on a separate machine and accessed through a network.

The security policies and rules stored in the policy data store 330 of some embodiments are defined based on the extended context (e.g., primary and secondary identities of the user and/or the application) that initiates the network request at the guest VM. In some embodiments, the security agents 315 send primary and secondary user information, which is used to identify associated roles and groups for the primary and secondary users through lookups performed on the directory 340. In some such embodiments, the network policies stored in the policy data store 330 are defined based on the identified user groups or roles, allowing an administrator to clearly define and maintain permissions for several users in the network.

The policy data store 330 stores rules for authorizing network requests based on the context of each request. In this example, the policy data store 330 includes a rules table 335, with rules defined based on primary and secondary identifications for applications and groups. The rules table 335 of some embodiments is populated by a centralized network policy manager, which maintains the network policy and provides the necessary portions of the network policy to the security data store 330 of each security engine 310. Each rule of the rules table 335 identifies different sets of attributes for the network request, as well as an action (i.e., allow, reject) for the rule. In some embodiments, the policy data store 330 uses additional context information (e.g., network request type, protocol, application type, etc.) to define network policies.

II. Monitoring Network Requests

Figure 4:
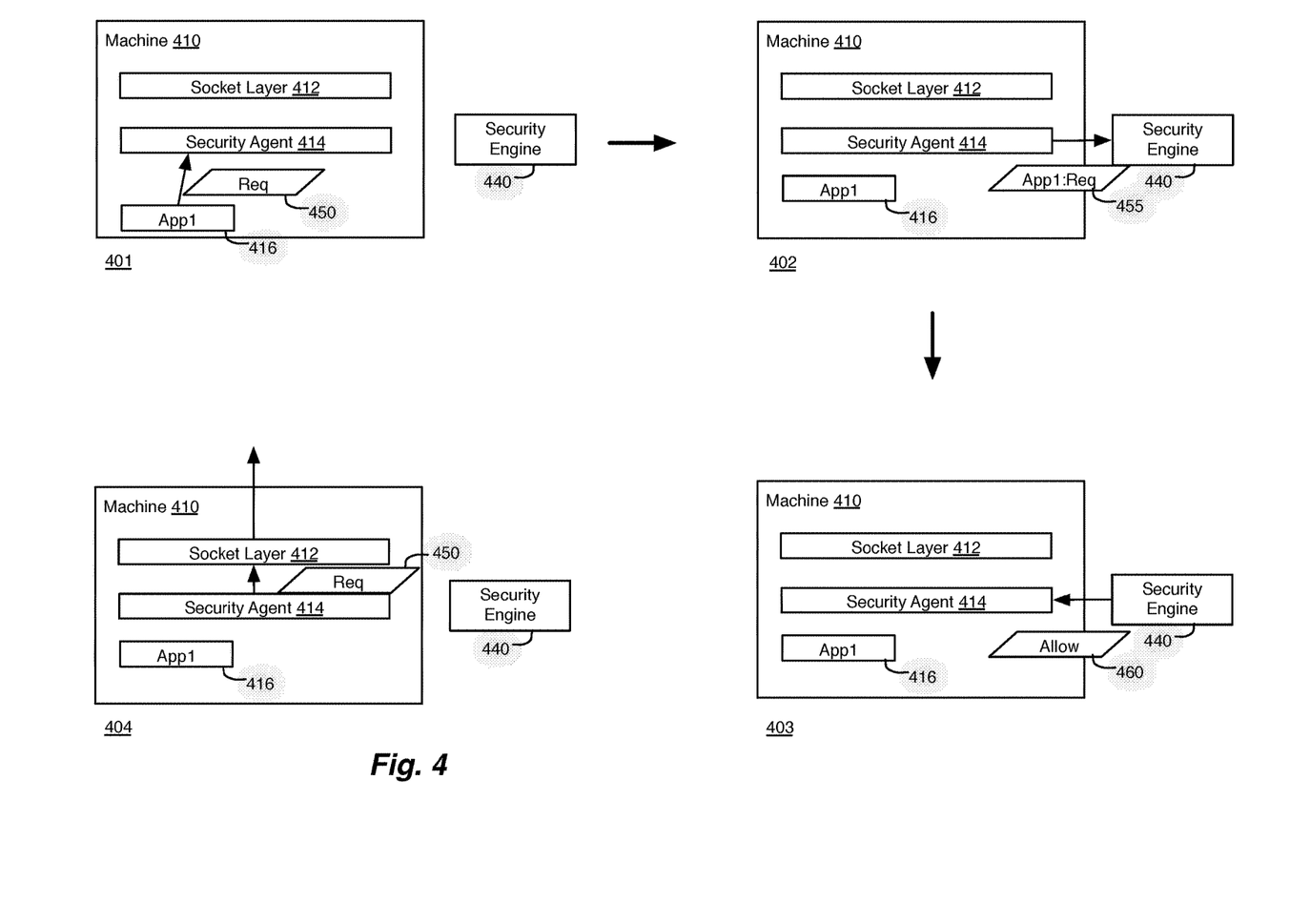
FIG. 4 illustrates an example of authorizing network requests for a machine in a network.

FIG. 4 illustrates an example of authorizing network requests for a machine in a network in three stages 401-403. This example shows a machine 410 that makes network requests and a security engine 440 for authorizing the requests based on the context of each request.

The machine 410 includes a socket layer 412, a security agent 414, and an application App1. The machine 410 of some embodiments is a virtual machine operating on a host machine (not shown) in a network, where the host machine uses a hypervisor to host multiple virtual machines. In some embodiments, the hypervisor of each host machine provides a security agent to handle the network requests of all of the virtual machines operating on the host machine. The security agent 414 of some embodiments captures (1) every new connection request (e.g., both incoming and outgoing connection requests) and (2) contextual information (e.g., user identity and application context) for the new connections.

In this example, the first stage 401 shows that application 416 sends a socket connection request 450 to the security agent 414. In some embodiments, the socket connection request 450 is a request for a webpage or for other remote resources on a server computer. In some embodiments, the connection request 450 includes an application identification (ID) that identifies the calling application.

The security agent 414 of some embodiments captures all network requests generated by applications and users on the guest VM. The security agent 414 then determines whether the request should be allowed, before either creating the connection or discarding the request.

In order to provide the necessary information to make the authorization decision, the security agent 414 of some embodiments identifies extended context information for the network request 450. The context information of some embodiments includes information related to the network request, such as primary and secondary IDs for the calling application and/or user. The primary and secondary IDs allow the security engine to enforce network policies that can identify malicious or impersonated applications or users.

In the second stage 402, the security agent 414 sends request information 455 to security engine 440 to authorize the network request. The request information 455 of some embodiments includes the collected context information (e.g., ID for the calling application "App1"), as well as the network request.

In the third stage 403, the security engine 440 makes an authorization decision based on the network request and the associated context information and sends a decision 460 back to the security agent 414.

The fourth stage 404 shows that, based on the allow decision 460 received from the security engine 440, the security agent 414 sends the connection request 450 to the socket layer 412 to initiate a socket connection.

Figure 5:
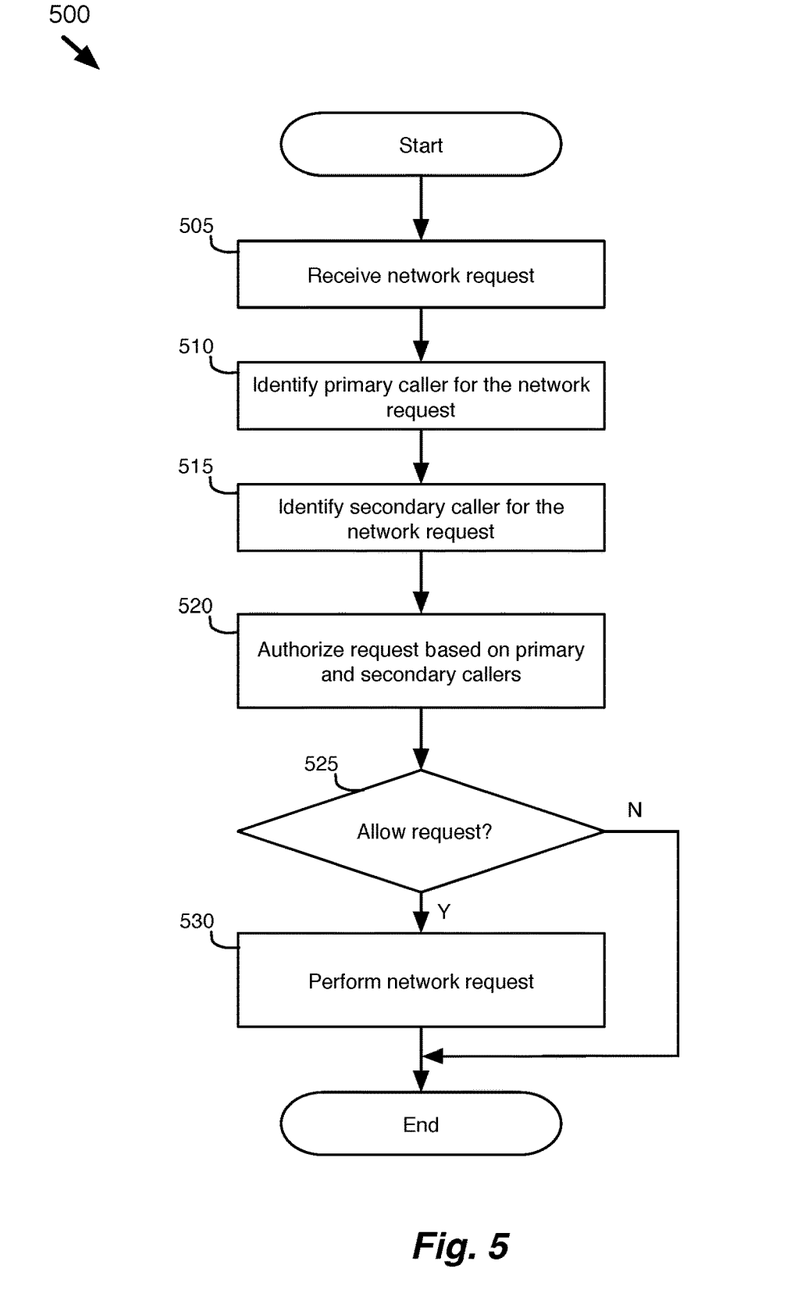
FIG. 5 conceptually illustrates a process for monitoring network requests for a machine in a network.

FIG. 5 conceptually illustrates a process for monitoring network requests for a machine in a network. In some embodiments, the process 500 is performed by a security agent operating on each guest VM on a host machine. The process 500 begins by receiving (at 505) a network request from an entity operating on the guest VM. The network request may be received from an application or a system kernel of the guest VM. The process 500 then identifies (at 510) a primary caller for the network request. The primary caller of some embodiments is the actual application and/or user directly associated with the network request. In some cases, the primary caller is the system kernel.

The process 500 then identifies (at 515) a secondary caller for the network request. In some embodiments, the network request can be initiated by a malicious program that causes a whitelisted program to send a network request. By identifying the secondary caller, authorization decisions can be made based on both the primary and secondary callers, providing the security engine with a more complete context for the network request.

The process 500 then authorizes (at 520) the network request based on the primary and secondary callers. The process 500 of some embodiments analyzes a type for the network request (e.g., socket connection request, etc.), as well as the identifications of the primary and secondary callers to determine whether to authorize the network request. In some embodiments, the process 500 analyzes a combination of primary and secondary identifications for both applications and users (or roles and groups assigned to the users) to authorize a network request.

In some embodiments, the authorization is performed by a security engine that operates separately from the security agent that captures the network requests. In some such embodiments, the security engine operates in a hypervisor of a host machine and authorizes network requests for all of the VMs operating on the host machine. Security engines are described in further detail above with reference to FIG. 2.

The process 500 then determines (at 525) whether the network request has been allowed or rejected. When the process 500 determines (at 525) that the network request is not allowed, the process 500 ends. When the process 500 determines (at 525) that the network request is allowed, the process 500 performs (at 530) the network request (e.g., initiates a socket connection), and then ends.

Figure 6:
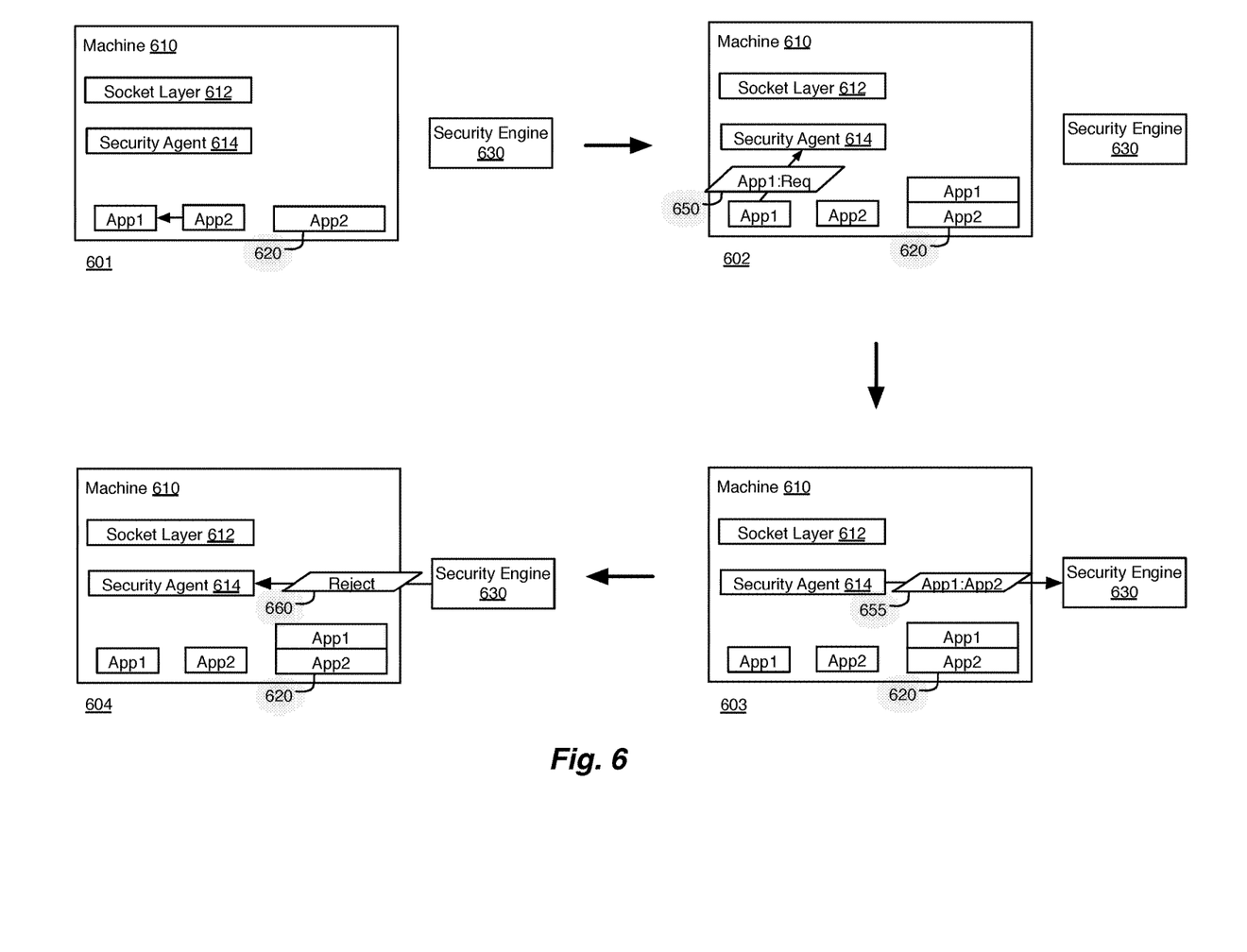
FIG. 6 illustrates an example of providing secondary information for authorization of network requests for applications operating on a machine.
Figure 7:
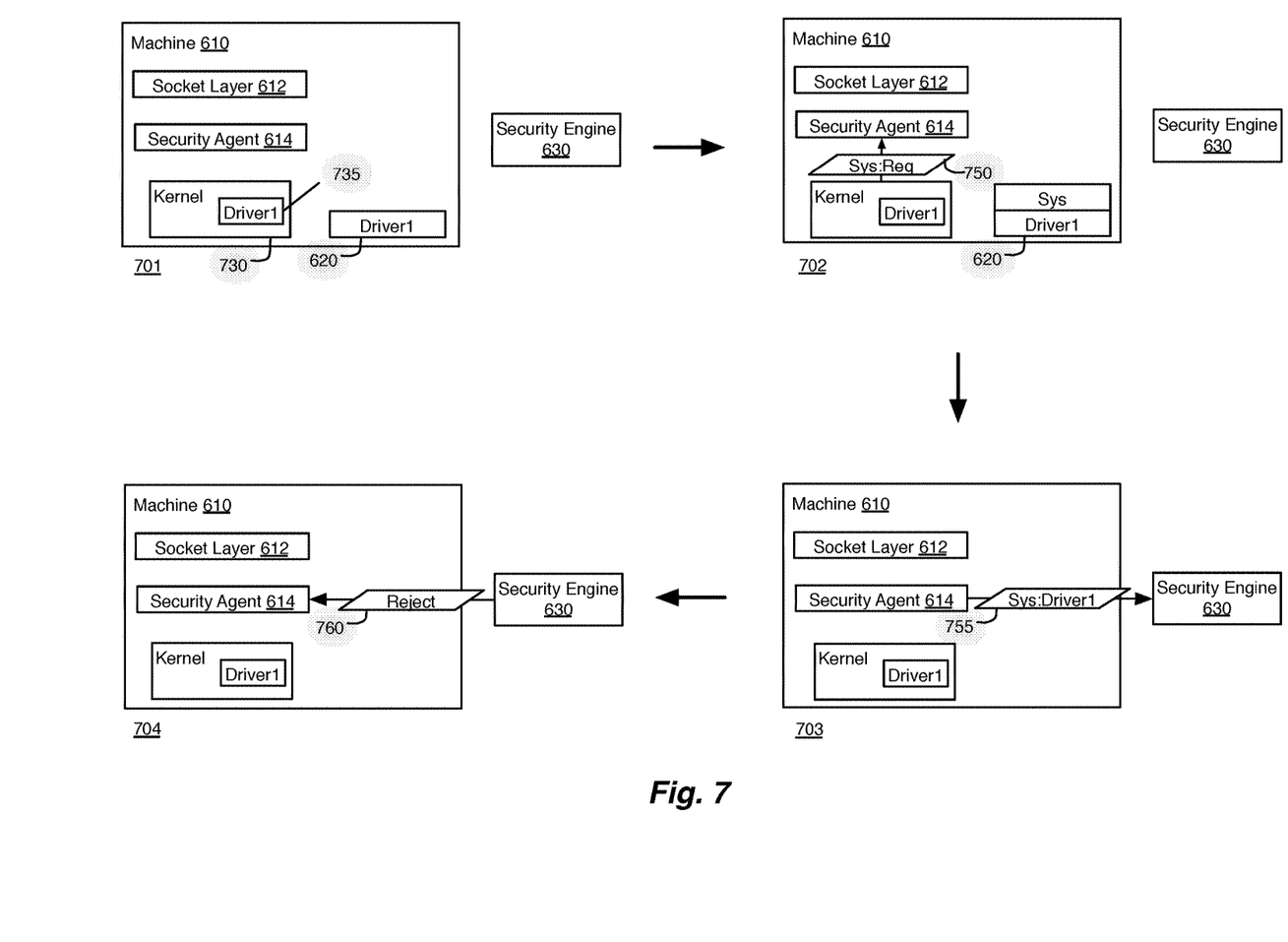
FIG. 7 illustrates an example of providing secondary information for authorization of network requests for system requests from the system kernel of a machine.
Figure 8:
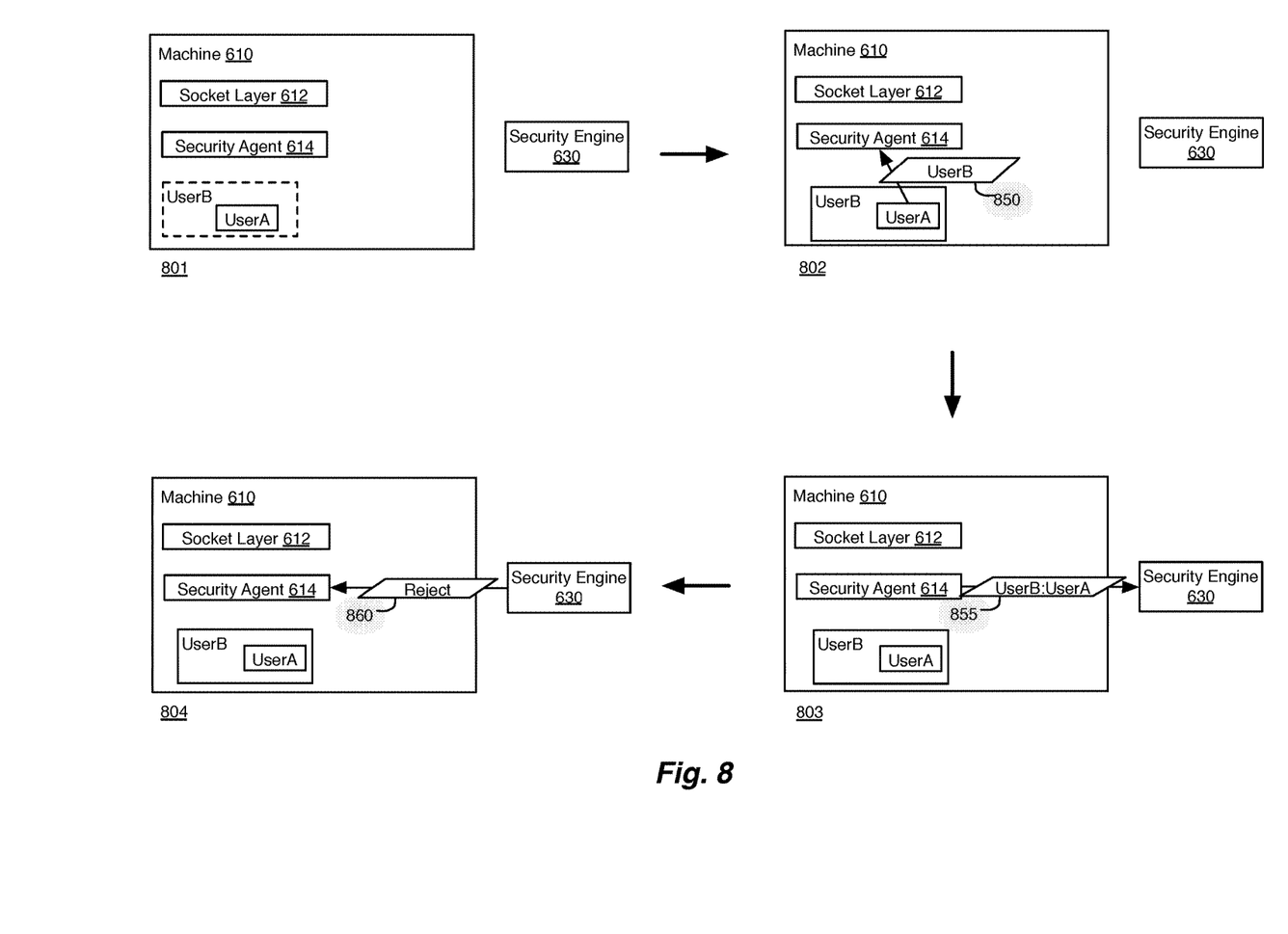
FIG. 8 illustrates an example of providing secondary information for authorization of network requests for impersonated users.

FIGS. 6-8 illustrate different examples of providing extended context information for authorizing network requests. FIG. 6 illustrates an example of providing secondary information for authorization of network requests for applications operating on a machine in four stages 601-604. Like the example of FIG. 4, this example shows a security engine 630 and a machine 610 with a socket layer 612, security agent 614, and an application App1. In addition, FIG. 6 shows a second application App2 and a call stack 620.

The second application App2 may be any application that causes another application to initiate a network request. For example, in some embodiments, the second application App2 is a malicious application that writes code into the memory space of the allowed (or whitelisted) first application App1, and causes App1 to send a network request. The malicious application injects the malicious code into the genuine process so that the generated network event is reported as the genuine process. Similarly, a malicious application can also write execution code page within a process memory space and run a thread executing this code from a different process. With these two methods of code injection, malicious applications can covertly perform the network action by masquerading as a whitelisted or allowed application.

For example, many web browsers support plugins that run from the same browser process, usually as a Dynamic Link Library (DLL). In such an example, App2 is a plugin for a whitelisted application App1 that operates within the context of the whitelisted application. When a network event is generated from the malicious plugin DLL, the network connection appears to have been initiated by the whitelisted web browser process. In such cases, extended context information provides the security engines with the necessary information to prevent the malicious plugin from making network requests while masquerading as the whitelisted application.

In the first stage 601, the second application App2 sends a request or otherwise causes the first application App1 to send a network request to the socket layer 612 to create a socket connection to another machine, such as a server. However, when the second application App2 makes the request, an entry is made in the call stack 620. The call stack stores information about active processes operating on the machine 610, so when App2 makes the request to operate on App1, an entry for App2 is made on the call stack 620.

The second stage 602 shows that the first application sends a network request 650 toward the socket layer 612, which adds a second entry (for App1) to the top of the call stack 620. The second stage 602 also shows that security agent 614 intercepts the network request 650.

At this point, the network request 650 appears to have been sent by the whitelisted first application App1. However, the security agent 614 of some embodiments identifies a secondary application (i.e., App2) by performing a stack walk through the call stack 620. In some embodiments, the security agent 614 walks through the stack to identify an application or process that is at a layer immediately below the request from the first application.

The third stage 603 shows that the security agent 614 sends request information 655 to the security engine 630. The request information 655 of some embodiments includes context information (e.g., identifications for both the primary and secondary applications (App1 and App2), user information, system information, etc.) as well as information about the network request (e.g., source, destination, type, etc.). In some embodiments, the network request itself is sent to the security engine 630. The security engine 630 uses the request information 655, including the primary and secondary application information, to analyze and authorize the network request 650. In some embodiments, the security engine 630 maintains a whitelist of allowed application and verifies that both the primary and secondary applications are allowed to initiate a particular network request before allowing the particular network request.

The security engine 630 of some embodiments uses the primary and secondary application information to analyze and authorize the network request 650 according to established network policies. The security engine 630 of some embodiments maintains permissions for each application and verifies that both the primary and secondary application are authorized for each network request. In other embodiments, permissions are defined based on the primary and secondary application identifications. For example, in some cases, a particular application may only be authorized to make a particular network request when the particular application is operating as a primary application, or as a secondary application with a particular primary application.

As described above with reference to FIG. 3, the security engine 630 of some embodiments enforces a set of network policies through a set of rules for authorizing different operations of the guest VM. In this example, App1 is a whitelisted application, while App2 is an application that has been identified as malicious, so the network request is rejected.

In the fourth stage 604, the security engine 630 has analyzed the received network request 650, along with the identifications of the applications App1 and App2. The fourth stage 604 shows that the security engine 630 sends a rejection message 660 to the security agent 614, which then discards the network request 650 that was received from application App1.

In some cases, rather than masquerading as a whitelisted application, malicious code is used to initiate network requests as the kernel of the operating system of a machine. FIG. 7 illustrates an example of providing secondary information for authorization of network requests for the system kernel of a machine in four stages 701-704. Like the example of FIG. 6, this example shows security engine 630 and machine 610 with a socket layer 612, security agent 614, and call stack 620. Rather than applications, this figure shows a kernel 730 and a driver 735 operating within the kernel 730.

Driver 735 is one of many drivers that operate within the kernel 730 as part of the kernel process. When the drivers initiate network requests, the network requests are seen as part of the system process. If a malicious or faulty driver is installed within the kernel 730, it becomes difficult to manage the network requests initiated by the kernel without affecting the performance of the kernel.

In the first stage 701, the driver 735 initiates a network request in the kernel 730. As for the applications described above, an entry (Driver1) is made in the call stack 620 for the calling driver 735. The call stack stores various information about active processes operating on the machine 610, so when the driver makes the call, it gets stored on the call stack 620.

The second stage 702 shows that the kernel 730 sends the network request 750 to the socket layer 612 to create a socket connection to another machine, such as a server. This adds a second entry (for a system process) to the top of the call stack 620. The second stage 702 also shows that security agent 614 intercepts the network request 750.

At this point, the network request 750 appears to be a system request, initiated by the kernel 730. However, the security agent 614 of some embodiments identifies a secondary application (i.e., Driver1) by performing a stack walk through the call stack 620. In some embodiments, the security agent 614 walks through the stack to identify drivers or other modules that are identified at layers immediately below the request from the kernel 730.

The third stage 703 shows that the security agent 614 sends request information 655 to the security engine 630. In this example, the context information for the request information 755 identifies the request as a system request from the kernel 730, but also includes information on the calling driver 735 ("Driver1"). The security engine 630 uses the driver information to analyze and authorize the network request 650. In some embodiments, the security engine 630 stores the various system and driver requests and generates a whitelist of allowed drivers based on properties (e.g., name, path, hash value, etc.) of the calling driver. In some embodiments, a network administrator analyzes the driver requests to verify that network requests from particular drivers are to be allowed or rejected.

In the fourth stage 704, the security engine 630 has analyzed the received network request 750, along with the driver 735. The fourth stage 604 shows that the security engine 630 sends a rejection message 760 to the security agent 614, which then discards the network request 750 that was received from the system kernel 735.

The examples above describe capturing extended application contexts from the call stack of a machine. Alternatively, or conjunctively, the security agent of some embodiments captures primary and secondary user information to provide additional user information that can be used to make authorization decisions for network requests.

Operating systems allow threads in a process to run in a user context that differs from the original user who has logged into the machine. User-based access policies can be circumvented when a process is launched by a first user, but a thread inside the process impersonates as a second different user. Network policy decisions that are made based only on the process or thread token provides a gap where the application can circumvent policies. For example, suppose a user in a first role (e.g., nurse role) is blocked from using FTP, but users in a second role (e.g., doctor role) are allowed to use FTP. An application started by the nurse role can do a thread impersonation of a doctor's process token and can gain access to FTP.

FIG. 8 illustrates an example of providing secondary information for authorization of network requests for impersonated users in four stages 801-804. Like the example of FIG. 6, this example shows security engine 630 and machine 610 with a socket layer 612, security agent 614, and call stack 620. Rather than applications, this figure shows a user UserA.

User A operates processes and applications on the machine 610, which are not shown for simplicity. In some embodiments, when the user initiates a process or thread, the process is associated with the user's token. However, a user can impersonate another user, creating processes associated with the impersonated user's token.

In the first stage 801, the UserA is logged into the machine 610. Processes that initiate network requests would be associated with a token that identifies UserA. However, the first stage 801 shows that UserA impersonates UserB to begin a process.

In the second stage 802, the process initiated by UserA sends a network request 850 to the socket layer 612 to create a socket connection to another machine, such as a server. However, the network request 850 appears to have been sent by a process started by UserB, rather than UserA.

In order to provide a more complete picture of the user information, the security agent 614 of some embodiments identifies a secondary user (i.e., UserA) as a part of the context to be sent to the security engine 630. In some embodiments, the operating system makes the impersonated user token, along with the logged-in user's token, available to the security agent 614.

The third stage 803 shows that the security agent 614 sends request information 855 to the security engine 630. In this example, the context information for the request information 855 includes the process's primary token, as well as the impersonated token.

The security engine 630 uses the primary and secondary user token information to analyze and authorize the network request 850 according to established network policies. The security engine 630 of some embodiments maintains permissions for a single user and verifies that both the primary and secondary user are authorized for each network request. In other embodiments, permissions are defined based on the impersonated and primary user identifications. For example, in some cases, a particular user may not be authorized to make a particular network request, unless the particular user is impersonating a different authorized user. In some embodiments, the security engine 630 uses a directory (e.g., Active Directory) that defines roles and groups for the various users, allowing an administrator to define network policies based on the defined roles.

In the fourth stage 804, the security engine 630 has analyzed the received network request 850, along with the primary and secondary user tokens. The fourth stage 804 shows that the security engine 630 sends a rejection message 860 to the security agent 614, which then discards the network request 850 that was received from the process initiated by UserA.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
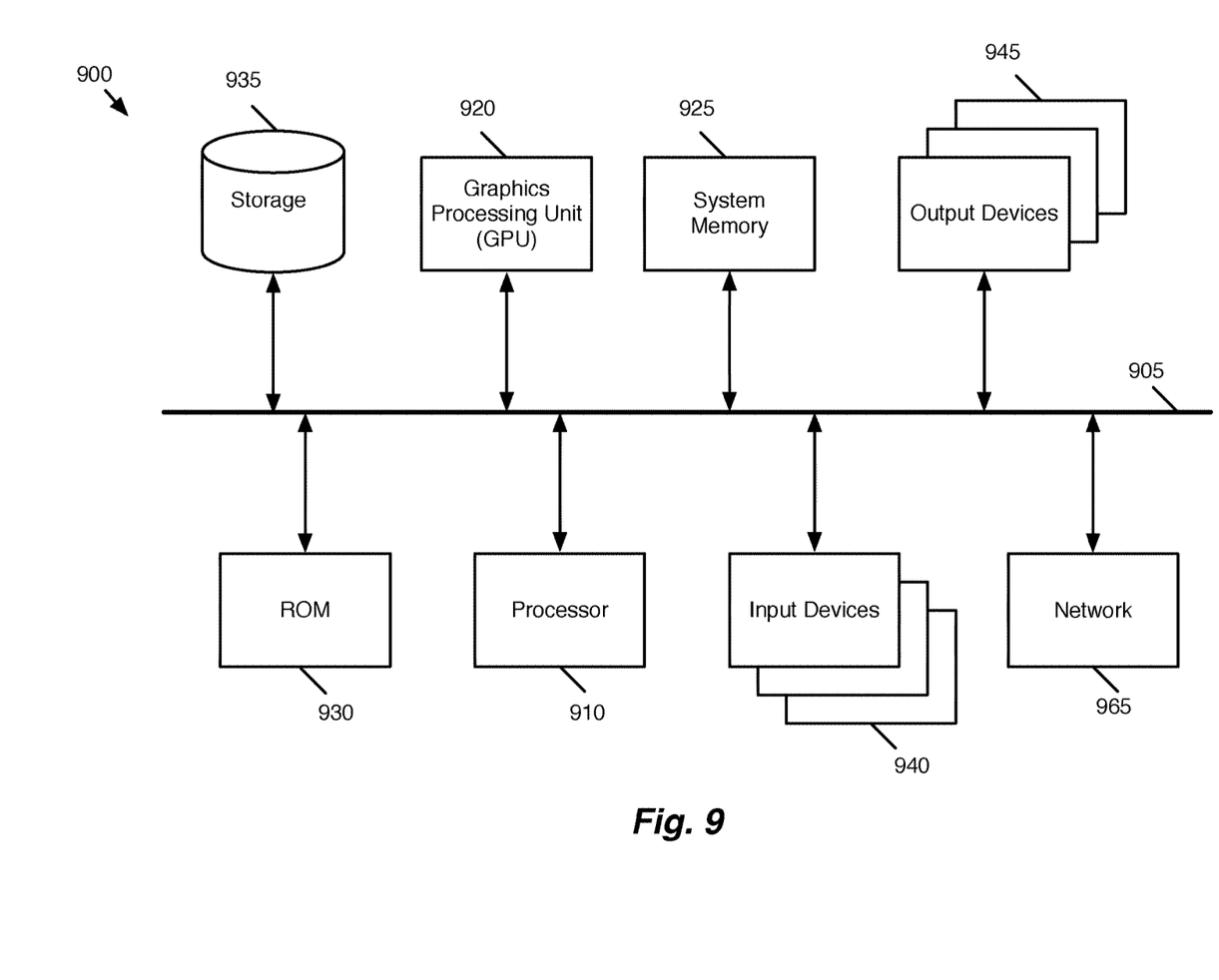
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash memory device, etc., and its corresponding drive) as the permanent storage device. Like the permanent storage device 935, the system memory 925 is a read-and-write memory device. However, unlike storage device 935, the system memory 925 is a volatile read-and-write memory, such a random access memory. The system memory 925 stores some of the instructions and data that the processor needs at runtime. In some embodiments, the invention's processes are stored in the system memory 925, the permanent storage device 935, and/or the read-only memory 930. From these various memory units, the processing unit(s) 910 retrieves instructions to execute and data to process in order to execute the processes of some embodiments.

The bus 905 also connects to the input and output devices 940 and 945. The input devices 940 enable the user to communicate information and select commands to the electronic system. The input devices 940 include alphanumeric keyboards and pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

The term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A non-transitory machine readable medium storing a program which when executed by at least one hardware processing unit monitors network access requests from a machine executing on a host computer, the program comprising sets of instructions for:

receiving, from a first application executing on the machine, a network access request that has a set of attributes associated with the first application;

identifying a second application executing on the machine to be associated with the network access request, the second application associated with an application identifier;

analyzing the network access request by using the second application identifier to identify, from a context-based security rule storage that stores context-based security rules that are associated with application identifiers, a context-based security rule associated with the second application identifier, and using the identified rule to determine whether to allow the network access request; and when the network access request is allowed, performing the network access request.

2. The non-transitory machine readable medium of claim 1, wherein the set of instructions for identifying the second application comprises a set of instructions for stepping through a process stack to identify the second application.

3. The non-transitory machine readable medium of claim 1, wherein the machine is a first machine, wherein the network access request is a socket request to create a connection from the first application to a third application executing on a second machine.

4. The non-transitory machine readable medium of claim 1, wherein the set of instructions for analyzing the network access request comprises sets of instructions for:

sending identities of the first and second applications to an authentication engine; and receiving a response that indicates whether the network access request is allowed.

5. The non-transitory machine readable medium of claim 4, wherein the machine is a first virtual machine operating on the host computer and the authentication engine operates on a second virtual machine operating on the host computer.

6. The non-transitory machine readable medium of claim 5, wherein the machine is a first machine and the authentication engine operates on a second different machine.

7. The non-transitory machine readable medium of claim 5, wherein the authentication engine is for applying a set of firewall policies defined for the first and second machines.

8. The non-transitory machine readable medium of claim 7, wherein the set of firewall policies are based on the identifications of the first and second applications.

9. The non-transitory machine readable medium of claim 8, wherein the set of firewall policies are further based on a user that initiates the network access request, wherein the set of instructions for sending the network access request and the identifications further comprises a set of instructions for sending a user identification associated with the network access request to the authentication engine.

10. The non-transitory machine readable medium of claim 9, wherein the user identification is a first emulated user identification, wherein the set of instructions for sending the network access request and the identifications further comprises a set of instructions for sending a second originating user identification to identify the user that initiates the network access request.

11. A method for monitoring network access requests from a machine in a set of machines executing on a host computer, the method comprising:

receiving, from a first application executing on the machine, a network access request that has a set of attributes associated with the first application;

identifying a second application executing on the machine to be associated with the network access request, the second application associated with an application identifier;

analyzing the network access request by using the second application identifier to identify, from a context-based security rule storage that stores context-based security rules that are associated with application identifiers, a context-based security rule associated with the second application identifier, and using the identified rule to determine whether to allow the network access request; and when the network access request is allowed, performing the network access request.

12. The method of claim 11, wherein identifying the second application comprises stepping through a process stack to identify the second application.

13. The method of claim 11, wherein the machine is a first machine, wherein the network access request is a socket network access request to create a connection from the first application to a third application executing on a second machine.

14. The method of claim 11, wherein analyzing the network access request comprises:

sending identities of the first and second applications to an authentication engine; and receiving a response that indicates whether the network access request is allowed.

15. The method of claim 14, wherein the machine is a first virtual machine operating on the host computer and the authentication engine operates on a second virtual machine operating on the host computer.

16. The method of claim 15, wherein the machine is a first machine and the authentication engine operates on a second different machine.

17. The method of claim 15, wherein the authentication engine is for applying a set of firewall policies defined for the first and second machines.

18. The method of claim 17, wherein the set of firewall policies are based on the identifications of the first and second applications.

19. The method recited in claim 18, wherein the set of firewall policies are further based on a user that initiates the network access request, wherein sending the network access request and the identifications further comprises sending a user identification associated with the network access request to the authentication engine.

20. The method recited in claim 19, wherein the user identification is a first emulated user identification, wherein sending the network access request and the identifications further comprises sending a second originating user identification to identify the user that initiates the network access request.

* * * * *